(12) United States Patent
Shih et al.

(10) Patent No.: US 12,199,807 B2
(45) Date of Patent: Jan. 14, 2025

(54) WIRELESS TRANSCEIVER HAVING IN-PHASE QUADRATURE-PHASE CALIBRATION FUNCTION

(71) Applicant: REALTEK SEMICONDUCTOR CORPORATION, Hsinchu (TW)

(72) Inventors: Kuan-Yu Shih, Hsinchu (TW); Chia-Jun Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 394 days.

(21) Appl. No.: 17/678,052

(22) Filed: Feb. 23, 2022

(65) Prior Publication Data
US 2022/0286343 A1 Sep. 8, 2022

(30) Foreign Application Priority Data
Mar. 2, 2021 (TW) ................................. 110107236

(51) Int. Cl.
*H04L 27/36* (2006.01)
*H04L 27/38* (2006.01)

(52) U.S. Cl.
CPC ........ *H04L 27/364* (2013.01); *H04L 27/3863* (2013.01)

(58) Field of Classification Search
CPC ........................... H04L 27/364; H04L 27/3863
See application file for complete search history.

(56) References Cited

U.S. PATENT DOCUMENTS

| 8,502,716 | B1* | 8/2013 | Matsuura | H04L 27/364 |
| | | | | 341/120 |
| 8,559,488 | B1 | 10/2013 | Smaini et al. | |
| 9,871,688 | B2* | 1/2018 | Avraham | H04B 1/1036 |
| 10,097,284 | B1* | 10/2018 | Kuan | H04B 1/30 |
| 10,382,087 | B1* | 8/2019 | Dror | H04B 1/525 |
| 2015/0271005 | A1* | 9/2015 | Wang | H04L 27/364 |
| | | | | 375/254 |
| 2016/0056903 | A1* | 2/2016 | Wang | H04L 25/06 |
| | | | | 375/219 |
| 2016/0094379 | A1* | 3/2016 | Grasso | H04L 27/3836 |
| | | | | 375/320 |
| 2016/0269208 | A1* | 9/2016 | Smail | H04L 27/3881 |
| 2017/0111188 | A1* | 4/2017 | Deng | H03F 3/45179 |

(Continued)

*Primary Examiner* — Blake J Rubin
(74) *Attorney, Agent, or Firm* — WPAT, PC (57) ABSTRACT

A wireless transceiver having an in-phase quadrature-phase (IQ) calibration function includes a transmitter, a receiver, a signal generator, and a switch circuit. The switch circuit includes a first and a second switch circuits. The first switch circuit is turned on in a receiver-end calibration process, and outputs a predetermined signal from the signal generator to the transmitter. The second switch circuit is turned on in the receiver calibration process and outputs a derivative signal of the predetermined signal from the transmitter to the receiver to let the receiver performs a receiver-end IQ calibration accordingly. The first switch circuit is turned off and the second switch circuit is turned on in a transmitter-end calibration process; the second switch circuit outputs a radio-frequency signal from the transmitter to the receiver to let the receiver generates a calibration reference accordingly; and the transmitter performs a transmitter-end IQ calibration according to the calibration reference.

9 Claims, 5 Drawing Sheets

(56) References Cited

U.S. PATENT DOCUMENTS

2018/0183636 A1* 6/2018 Ganesan ............... H04L 43/16
2021/0104981 A1* 4/2021 Brown, Jr. ............ H03F 3/195
2021/0314072 A1* 10/2021 Rozenblit ............. H04B 15/06

* cited by examiner

Fig. 4b

WIRELESS TRANSCEIVER HAVING IN-PHASE QUADRATURE-PHASE CALIBRATION FUNCTION

BACKGROUND OF THE INVENTION

1. Field of the Invention

The present disclosure relates to a wireless transceiver, especially to a wireless transceiver having an in-phase quadrature-phase (IQ) calibration function.

2. Description of Related Art

A radio-frequency (RF) transceiver usually transmits/receives signals with an in-phase quadrature-phase (IQ) modulation/demodulation technology. During transmission, the RF receiver up-converts frequencies of an in-phase path signal and a quadrature-phase path signal into RF frequencies with a local oscillator and then transmits the converted signals, wherein the in-phase path signal and the quadrature-phase path signal have identical amplitudes, but their phases differ by 90 degrees. For example, the in-phase path signal can be expressed as $I=\sin(2*\pi*f*t)$ and the quadrature-phase path signal can be expressed as $Q=\sin(2*\pi*f*t-90)$, wherein "f" denotes "frequency" and "t" denotes "time"; provided f is 10 MHz and the frequency of the oscillation signal of the local oscillator is 2412 MHz, the frequencies of the converted signals will be "2412+10=2422 MHz". In consideration of that the circuit in the in-phase path and the circuit in the quadrature-phase path are not identical, the in-phase signal and the quadrature-phase signal do not completely match and they can't jointly form an ideal signal (e.g., an ideal differential signal), and this leads to the generation of signals at the frequency "(2412−10)=2402 MHz". The signals at the above-mentioned frequency 2422 MHz are called required signals, and the signals at the above-mentioned frequency 2402 MHz are called image signals. The ratio of the intensity of the image signals to the intensity of the required signals is an image rejection ratio (IRR) that is usually measured by the unit "dB". A good transceiver is characterized by a low IRR. In order to realize a low IRR, a transceiver needs to compensate for the mismatch between the in-phase signal and the quadrature-phase signal.

A current technology for the above-mentioned compensation includes the following steps: outputting a predetermined sine wave to an in-phase path and an quadrature-phase path in a receiver of a transceiver; making the receiver observe the difference between the sine wave transmitted with the in-phase path and the sine wave transmitted with the quadrature-phase path and thereby perform receiver-end (RX) IQ calibration accordingly; after the RX IQ calibration, making the receiver receive an RF transmission signal from a transmitter of the transceiver and thereby generate an observation result according to the difference between the RF transmission signal transmitted with the in-phase path and the RF transmission signal transmitted with the quadrature-phase path; and making the receiver output the observation result to the transmitter to let it perform transmitter-end (TX) IQ calibration accordingly. However, since an RF front-end circuit of the receiver is not identical to an RF front-end circuit of the transmitter, the symmetry and output impedance observed by the receiver during the RX IQ calibration are different from the symmetry and output impedance observed by the receiver during the TX IQ calibration. Therefore, the RX IQ calibration performed by the receiver earlier won't be completely compatible for the TX IQ calibration performed by the transmitter later. As a result, this current technology is hard to realize a low IRR.

A related prior art is found in a U.S. Pat. No. 8,559,488B1.

SUMMARY OF THE INVENTION

A purpose of the present disclosure is to provide a wireless transceiver having an in-phase quadrature-phase (IQ) calibration function and being capable of preventing the problems in the prior art.

An embodiment of the wireless transceiver of the present disclosure includes a transmitter, a receiver, a signal generator, and a switch circuit. The transmitter includes a transmitter-end (TX) digital circuit and a TX analog circuit. The receiver includes a receiver-end (RX) analog circuit and an RX digital circuit. The signal generator is configured to generate a predetermined signal in an RX calibration process. The switch circuit includes a first switch circuit and a second switch circuit. The first switch circuit is coupled to the signal generator and the transmitter in the RX calibration process. The second switch circuit is coupled to the transmitter and the receiver in the RX calibration process. The first switch circuit is turned off in a TX calibration process. The second switch circuit is coupled to the transmitter and the receiver in the TX calibration process.

On the basis of the above description, the TX digital circuit is configured to output a digital transmission signal. The TX analog circuit is coupled to the TX digital circuit, and includes a digital-to-analog converter, a TX mixing circuit, and a TX radio-frequency (RF) front-end circuit. The digital-to-analog converter is configured to convert the digital transmission signal into an analog transmission signal. The TX mixing circuit includes a TX in-phase path mixing circuit and a TX quadrature-phase path mixing circuit. The TX in-phase path mixing circuit is configured to be disabled in the RX calibration process, and configured to be enabled in the TX calibration process to generate a TX in-phase path up-conversion signal according to a TX in-phase path signal originated from the analog transmission signal. The TX quadrature-phase path mixing circuit is configured to be disabled in the RX calibration process, and configured to be enabled in the TX calibration process to generate a TX quadrature-phase path up-conversion signal according to a TX quadrature-phase path signal originated from the analog transmission signal, wherein the TX in-phase path up-conversion signal and the TX quadrature-phase path up-conversion signal jointly form an RF transmission signal. The TX RF front-end circuit includes multiple RF transmitting circuits coupled between the TX mixing circuit and an antenna.

On the basis of the above description, the RX analog circuit includes an RX RF front-end circuit, an RX mixing circuit, and an analog-to-digital converter. The RX RF front-end circuit includes at least one RF receiving circuit coupled between the antenna and the RX mixing circuit. The RX mixing circuit includes an RX in-phase path mixing circuit and an RX quadrature-phase path mixing circuit. The RX in-phase path mixing circuit is configured to generate an RX in-phase path down-conversion signal according to a reception signal, wherein in the RX calibration process the reception signal is originated from the predetermined signal of the signal generator, and in the TX calibration process the reception signal is originated from the RF transmission signal of the transmitter. The RX quadrature-phase path mixing circuit is configured to generate an RX quadrature-phase path down-conversion signal according to the reception signal. The analog-to-digital converter is configured to convert the RX in-phase path down-conversion signal or the derivative signal thereof into an in-phase path digital reception signal, and configured to convert the RX quadrature-phase path down-conversion signal or the derivative signal thereof into a quadrature-phase path digital reception signal. The RX digital circuit is configured to perform RX IQ calibration according to a first difference between the in-phase path digital reception signal and the quadrature-phase path digital reception signal in the RX calibration process. The RX digital circuit is further configured to output a calibration reference to the TX digital circuit according to a second difference between the in-phase path digital reception signal and the quadrature-phase path digital reception signal in the TX calibration process so that the TX digital circuit can perform TX IQ calibration according to the calibration reference.

On the basis of the above description, the first switch circuit is coupled between the signal generator and the TX RF front-end circuit and configured to be turned on in the RX calibration process to output the predetermined signal to the TX RF front-end circuit. The second switch circuit is coupled between the TX RF front-end circuit and the RX RF front-end circuit, and configured to be turned on in the RX calibration process and thereby output the derivative signal of the predetermined signal to the RX RF front-end circuit to let the RX mixing circuit and the analog-to-digital converter jointly generate the in-phase path digital reception signal and the quadrature-phase path digital reception signal accordingly. Afterward, the RX digital circuit can perform the RX IQ calibration according to the first difference between the in-phase path digital reception signal and the quadrature-phase path digital reception signal.

On the basis of the above description, the first switch circuit is turned off in the TX calibration process. The second switch circuit is turned on in the TX calibration process and thereby outputs the derivative signal of the RF transmission signal to the RX RF front-end circuit to let the RX mixing circuit and the analog-to-digital converter jointly generate the in-phase path digital reception signal and the quadrature-phase path digital reception signal accordingly. Afterward, the RX digital circuit can output the calibration reference to the TX digital circuit according to the second difference between the in-phase path digital reception signal and the quadrature-phase path digital reception signal, and the TX digital circuit can perform the TX IQ calibration according to the calibration reference.

Another embodiment of the wireless transceiver of the present disclosure includes a transmitter, a receiver, a signal generator, and a switch circuit, wherein the switch circuit includes a first switch circuit and a second switch circuit. The first switch circuit is coupled between the signal generator and the transmitter. The first switch circuit is configured to be turned on in a receiver-end (RX) calibration process to output a predetermined signal of the signal generator to the transmitter. The first switch circuit is further configured to be turned off in a transmitter-end (TX) calibration process. The second switch circuit is coupled between the transmitter and the receiver. The second switch circuit is configured to be turned on in the RX calibration process to output a derivative signal of the predetermined signal from the transmitter to the receiver so that the receiver performs RX IQ calibration according to the derivative signal of the predetermined signal. The second switch circuit is further configured to be turned on in the TX calibration process to output a derivative signal of an RF transmission signal from the transmitter to the receiver so that the receiver generates a calibration reference according to the derivative signal of the RF transmission signal and outputs the calibration reference to the transmitter to let the transmitter perform TX IQ calibration according to the calibration reference.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a wireless transceiver having an in-phase quadrature-phase (IQ) calibration function. The wireless transceiver allows the circuit symmetry and output impedance observed by a receiver of the wireless transceiver during a receiver-end (RX) IQ calibration to be identical/similar to the circuit symmetry and output impedance observed by the receiver during a transmitter-end (TX) IQ calibration, so that a low image rejection ratio (IRR) can be realized after the IQ calibrations.

Figure 1:
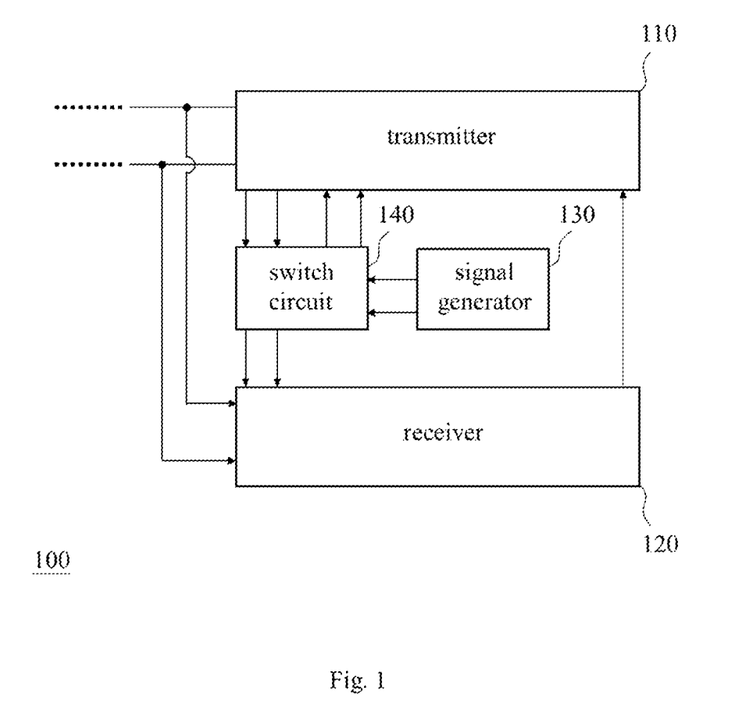
FIG. 1 shows a wireless transceiver having an in-phase quadrature-phase (IQ) calibration function according to an embodiment of the present disclosure.
Figure 2:
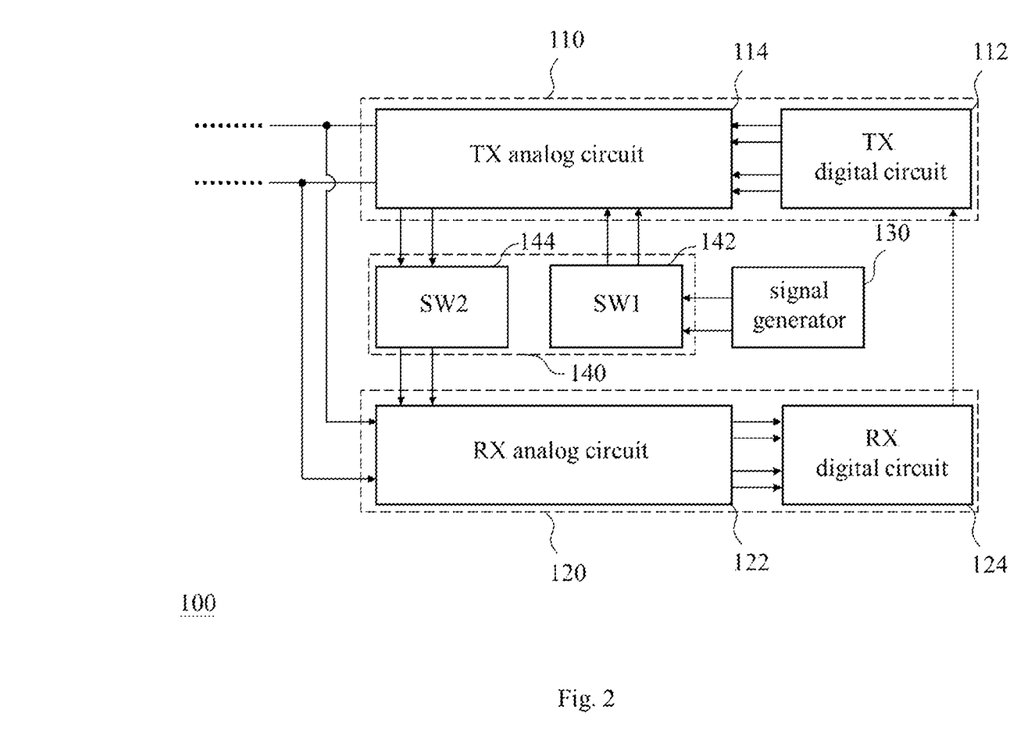
FIG. 2 shows the detail of the transmitter, receiver, and switch circuit of FIG. 1.

FIG. 1 shows an embodiment of the wireless transceiver of the present disclosure. The wireless transceiver 100 of FIG. 1 (e.g., a wireless local area network (LAN) transceiver or a Bluetooth transceiver) includes a transmitter 110, a receiver 120, a signal generator 130, and a switch circuit 140. FIG. 2 shows the detail of the transmitter 110, the receiver 120, and the switch circuit 140. As shown in FIG. 2, the transmitter 110 includes a TX digital circuit 112 and a TX analog circuit 114, the receiver 120 includes an RX analog circuit 122 and an RX digital circuit 124, and the switch circuit 140 includes a first switch circuit (SW1) 142 and a second switch circuit (SW2) 144.

Figure 3:
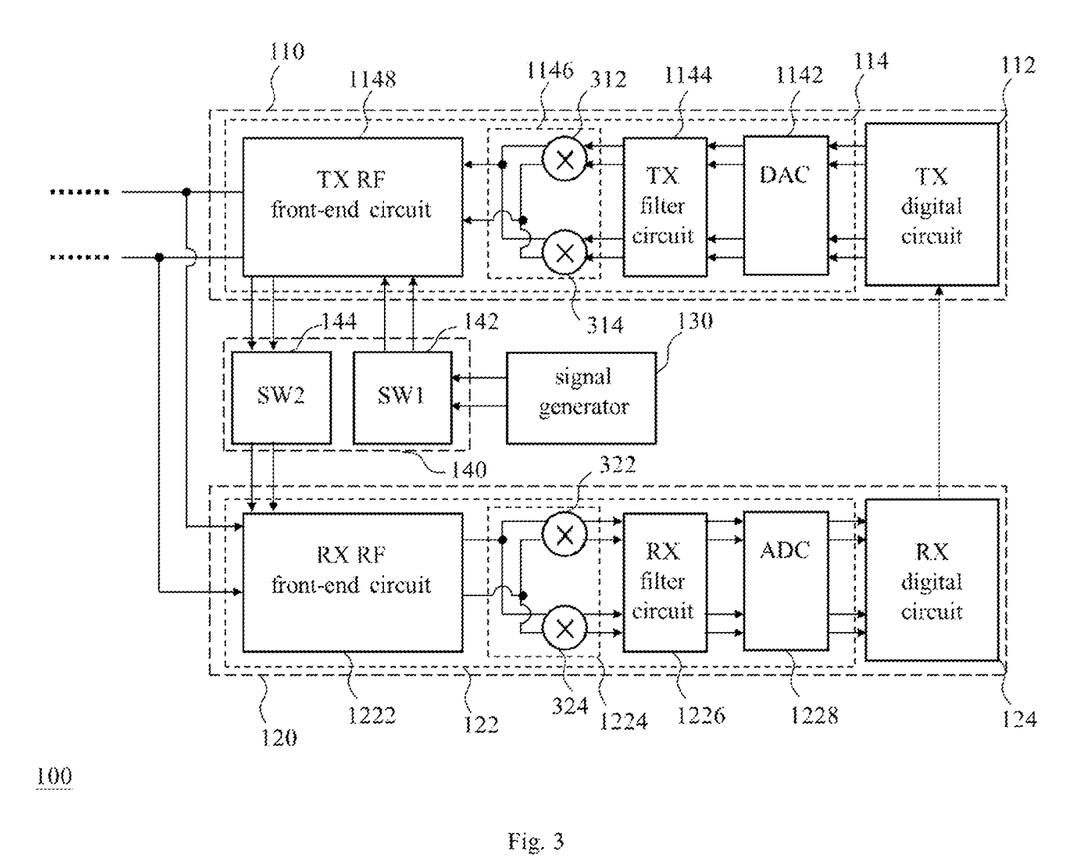
FIG. 3 shows an embodiment of the transmitter-end (TX) analog circuit and receiver-end (RX) analog circuit of FIG. 2.

Please refer to FIGS. 1~2. The first switch circuit 142 is turned on in an RX calibration process to couple the signal generator 130 with the transmitter 110 and then output a predetermined signal (e.g., a sine wave) generated by the signal generator 130 (e.g., a single tone generator) to the transmitter 110. The second switch circuit 144 is turned on in the RX calibration process to couple the transmitter 110 with the receiver 120 and then output a derivative signal of the predetermined signal from the transmitter 110 to the receiver 120 to let the receiver 120 perform the RX IQ calibration according to the derivative signal, wherein the predetermined signal is transmitted with the transmitter 110 and then treated as the derivative signal. It should be noted that the mixing circuit (e.g., the mixing circuit 1146 in FIG.

3) of the transmitter 110 is disabled in the RX calibration process to prevent the mixing circuit from outputting a signal interfering with the predetermined signal.

Please refer to FIGS. 1~2. The first switch circuit 142 is turned off in a TX calibration process. The second switch circuit 144 is turned on in the TX calibration process to couple the transmitter 110 with the receiver 120 and thereby output a radio-frequency (RF) transmission signal from the transmitter 110 to the receiver 120. Accordingly, the receiver 120 can generate a calibration reference according to the RF transmission signal and output the calibration reference to the transmitter 110 to let the transmitter 110 perform the TX IQ calibration according to the calibration reference.

In light of the above, in both the RX calibration process and the TX calibration process, the signal received by the receiver 120 is transmitted through an RF front-end circuit (e.g., the TX RF front-end circuit 1148 in FIG. 3) of the transmitter 110. Therefore, both the RX IQ calibration and the TX IQ calibration are based on the identical/similar characteristics of the RF front-end circuit of the transmitter 110, and the wireless transceiver 100 can achieve a better IRR after calibration.

FIG. 3 shows an embodiment of the TX analog circuit 114 and the RX analog circuit 122 of FIG. 2. As shown in FIG. 3, the TX analog circuit 114 is coupled to the TX digital circuit 112, and includes: a digital-to-analog converter (DAC) 1142; a TX filter circuit 1144; a TX mixing circuit 1146 including a TX in-phase path mixing circuit 312 and a TX quadrature-phase path mixing circuit 314; and a TX RF front-end circuit 1148, wherein if the TX analog circuit 114 has no need to use any filter, the TX filter circuit 1144 can be omitted. The RX analog circuit 122 is coupled to the RX digital circuit 124, and includes: an RX RF front-end circuit 1222; an RX mixing circuit 1224 including an RX in-phase path mixing circuit 322 and an RX quadrature-phase path mixing circuit 324; an RX filter circuit 1226; and an analog-to-digital converter (ADC) 1228, wherein if the RX analog circuit 122 has no need to use any filter, the RX filter circuit 1226 can be omitted. It should be noted that each of the DAC 1142, the TX filter circuit 1144, and the TX mixing circuit 1146 includes two sets of circuits for respectively processing the in-phase signal and the quadrature-phase signal. Similarly, each of the RX mixing circuit 1224, the RX filter circuit 1226, and the ADC 1228 includes two sets of circuits for respectively processing the in-phase signal and the quadrature-phase signal. The way to respectively process the in-phase signal and the quadrature-phase signal is common in this technical field, and its detail is omitted here.

Please refer to FIGS. 1~3. The TX digital circuit 112 is configured to output a digital transmission signal. The DAC 1142 is configured to convert the digital transmission signal into an analog transmission signal. The TX filter circuit 1144 is configured to filter the analog transmission signal. The TX in-phase path mixing circuit 312 is configured to be disabled in the RX calibration process; for example, this mixing circuit 312 is disabled and stops generating/outputting signals. The TX in-phase path mixing circuit 312 is further configured to be enabled in the TX calibration process to generate a TX in-phase path up-conversion signal according to a TX in-phase path signal (i.e., the in-phase part of the signal outputted by the TX filter circuit 1144) and a first oscillation signal (LO_I) of a local oscillator (not shown), wherein the TX in-phase path signal is originated from the analog transmission signal. The TX quadrature-phase path mixing circuit 314 is configured to be disabled in the RX calibration process; for example, this mixing circuit 314 is disabled and stops generating/outputting signals. The TX quadrature-phase path mixing circuit 314 is further configured to be enabled in the TX calibration process to generate a TX quadrature-phase up-conversion signal according to a TX quadrature-phase path signal (i.e., the quadrature-phase part of the signal outputted by the TX filter circuit 1144) and a second oscillation signal (LO_Q) of the local oscillator (not shown). The TX in-phase path up-conversion signal and the TX quadrature-phase up-conversion signal jointly form the aforementioned RF transmission signal.

Figure 4A:
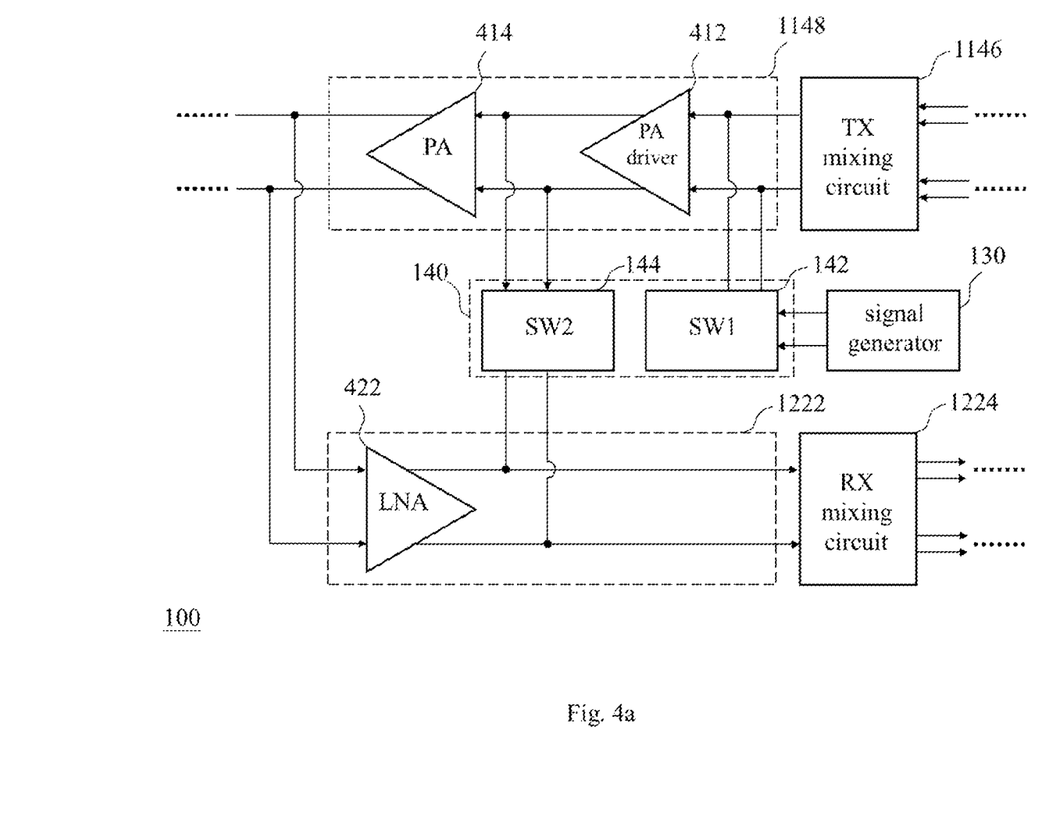
FIG. 4a shows an embodiment of the TX radio-frequency (RF) front-end circuit and RX RF front-end circuit of FIG. 3 and shows how the two front-end circuits are coupled through the switch circuit.
Figure 4B:
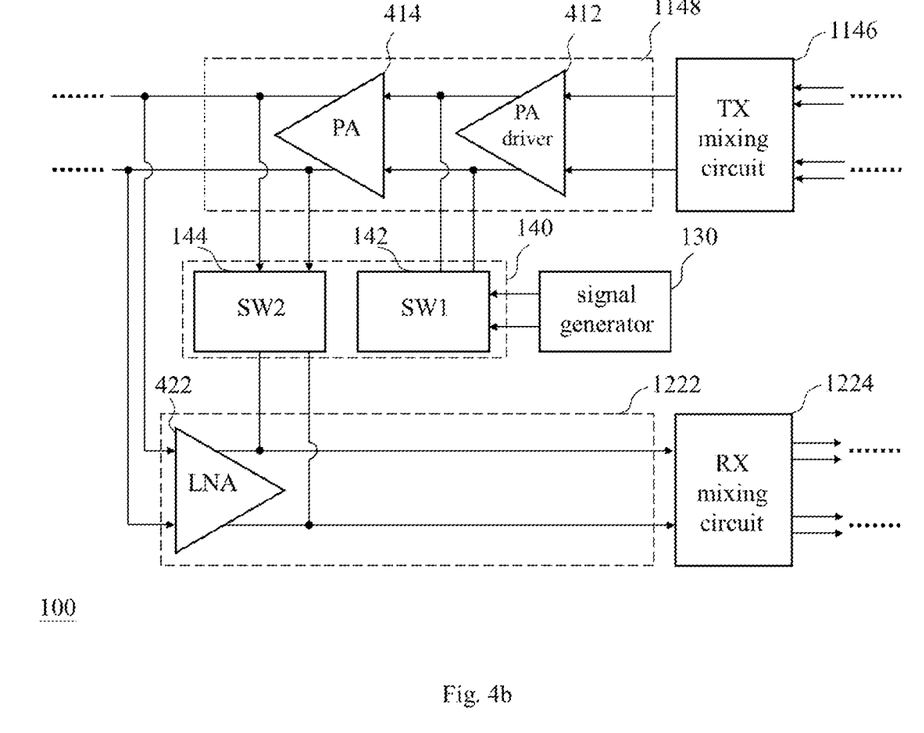
FIG. 4b shows an embodiment of the TX RF front-end circuit and RX RF front-end circuit of FIG. 3 and shows how the two front-end circuits are coupled through the switch circuit.

Please refer to FIGS. 1~3. The TX RF front-end circuit 1148 includes multiple RF transmitting circuits. These circuits are set between the TX mixing circuit 1146 and an antenna (not shown), wherein the antenna can be included in the wireless transceiver 100 or be set outside the wireless transceiver 100. One terminal of the first switch circuit 142 is coupled to the signal generator 130 while another terminal of the first switch circuit 142 is coupled to an input terminal of any of the multiple RF transmitting circuits. FIG. 4a/4b shows an embodiment of the multiple RF transmitting circuits and shows how the multiple RF transmitting circuits are coupled to the first switch circuit 142 and the second switch circuit 144. The multiple RF transmitting circuits in FIG. 4a/4b include a power amplifier driver (PA driver) 412 and a power amplifier (PA) 414, but the present invention is not limited thereto.

Please refer to FIGS. 1~3. The RX RF front-end circuit 1222 includes at least one RF receiving circuit that is set between the aforementioned antenna and the RX mixing circuit 1224. One terminal of the second switch circuit 144 is coupled to an output terminal of any of the multiple RF transmitting circuits while another terminal of the second switch circuit 144 is coupled to an output terminal or an input terminal of the at least one RF receiving circuit. FIG. 4a/4b shows an embodiment of the at least one RF receiving circuit and shows how the at least one RF receiving circuit is coupled to the second switch circuit 144. The at least one RF receiving circuit includes in FIG. 4a/4b a low noise amplifier (LNA) 422, but the present invention is not limited thereto.

Please refer to FIGS. 1~3. The RX in-phase path mixing circuit 322 is configured to generate an RX in-phase path down-conversion signal according to a reception signal and the aforementioned first oscillation signal (LO_I), wherein in the RX calibration process the reception signal is originated from the predetermined signal transmitted through the first switch circuit 142, the TX analog circuit 114, and the second switch circuit 144, and in the TX calibration process the reception signal is originated from the RF transmission signal transmitted through the TX analog circuit 114 and the second switch circuit 144. The RX quadrature-phase path mixing circuit 324 is configured to generate an RX quadrature-phase path down-conversion signal according to the reception signal and the aforementioned second oscillation signal (LO_Q). The RX filter circuit 1226 is configured to filter the RX in-phase path down-conversion signal and the RX quadrature-phase down-conversion signal. The ADC 1228 is configured to convert the RX in-phase path down-conversion signal or the derivative signal thereof (i.e., the in-phase part of the signal outputted by the RX filter circuit 1226) into an in-phase path digital reception signal, and convert the RX quadrature-phase path down-conversion signal or the derivative signal thereof (i.e., the quadrature-phase part of the signal outputted by the RX filter circuit 1226) into a quadrature-phase path digital reception signal. In the RX calibration process, the RX digital circuit 124 is configured to perform the RX IQ calibration according to a first difference between the in-phase path digital reception signal and the quadrature-phase path digital reception signal. In the TX calibration process, the RX digital circuit 124 is configured to output the calibration reference to the TX digital circuit 112 according to a second difference between the in-phase path digital reception signal and the quadrature-phase path digital reception signal to let the TX digital circuit 112 perform the TX IQ calibration according to the calibration reference.

On the basis of the above, in an exemplary implementation the first difference includes a first amplitude difference and a first phase difference while the second difference includes a second amplitude difference and a second phase difference. In the RX calibration process, the RX digital circuit 124 performs the RX IQ calibration according to the first amplitude difference and the first phase difference. In the TX calibration process, the RX digital circuit 124 outputs the calibration reference to the TX digital circuit 112 according to the second amplitude difference and the second phase difference to let the TX digital circuit 112 perform the TX IQ calibration according to the calibration difference. In an exemplary implementation, the RX digital circuit 124 performs the RX IQ calibration to compensate for (e.g., minimize) the first amplitude difference and the first phase difference, and the TX digital circuit 112 performs the TX IQ calibration according to the calibration reference to compensate for (e.g., minimize) the second amplitude difference and the second phase difference. In an exemplary implementation, the RX digital circuit 124 performs the RX IQ calibration to make the first amplitude difference be equal to zero or approximate zero, and to make the first phase difference be equal to 90 degrees or approximate 90 degrees. Similarly, the TX digital circuit 112 performs the TX IQ calibration according to the calibration reference, and thereby makes the second amplitude difference be equal to zero or approximate zero and makes the second phase difference be equal to 90 degrees or approximate 90 degrees. Since the above-mentioned compensation can be realized with a known/self-developed manner (e.g., adjustments in circuit parameters), its detail is omitted here.

It should be noted that although the signal mentioned in the embodiments of FIGS. 1~4b is a differential signal, but the present invention is not limited thereto. Those having ordinary skill in the art can appreciate how to modify the wireless transceiver of the present disclosure to adapt it to a single-ended signal.

It should be noted that people of ordinary skill in the art can selectively use some or all of the features of any embodiment in this specification or selectively use some or all of the features of multiple embodiments in this specification to implement the present invention as long as such implementation is practicable; in other words, the present invention can be carried out flexibly.

To sum up, the wireless transceiver of the present disclosure can fulfill a low IRR.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A wireless transceiver having an in-phase quadrature-phase (IQ) calibration function, comprising:
   a transmitter including:
   a transmitter-end (TX) digital circuit configured to output a digital transmission signal; and
   a TX analog circuit coupled to the TX digital circuit, the TX analog circuit including:
   a digital-to-analog converter configured to convert the digital transmission signal into an analog transmission signal;
   a TX mixing circuit including:
   a TX in-phase path mixing circuit configured to be disabled in a receiver-end (RX) calibration process, and configured to be enabled in a TX calibration process to generate a TX in-phase path up-conversion signal according to a TX in-phase path signal originated from the analog transmission signal; and
   a TX quadrature-phase path mixing circuit configured to be disabled in the RX calibration process, and configured to be enabled in the TX calibration process to generate a TX quadrature-phase path up-conversion signal according to a TX quadrature-phase path signal originated from the analog transmission signal, wherein the TX in-phase path up-conversion signal and the TX quadrature-phase path up-conversion signal jointly form a radio-frequency (RF) transmission signal; and
   a TX RF front-end circuit including multiple RF transmitting circuits coupled between the TX mixing circuit and an antenna;
   a receiver including:
   an RX analog circuit including:
   an RX RF front-end circuit including at least one RF receiving circuit coupled between the antenna and an RX mixing circuit;
   the RX mixing circuit including:
   an RX in-phase path mixing circuit configured to generate an RX in-phase path down-conversion signal according to a reception signal, wherein the reception signal is originated from a predetermined signal in the RX calibration process, and the reception signal is originated from the RF transmission signal in the TX calibration process;
   an RX quadrature-phase path mixing circuit configured to generate an RX quadrature-phase path down-conversion signal according to the reception signal; and
   an analog-to-digital converter configured to convert the RX in-phase path down-conversion signal or a derivative signal of the RX in-phase path down-conversion signal into an in-phase path digital reception signal, and configured to convert the RX quadrature-phase path down-conversion signal or a derivative signal of the RX quadrature-phase path down-conversion signal into a quadrature-phase path digital reception signal; and
   an RX digital circuit configured to perform RX IQ calibration according to a first difference between the in-phase path digital reception signal and the quadrature-phase path digital reception signal in the RX calibration process, and the RX digital circuit configured to output a calibration reference to the TX digital circuit according to a second difference between the in-phase path digital reception signal and the quadrature-phase path digital reception signal in the TX calibration process to let the TX digital circuit perform TX IQ calibration according to the calibration reference;
   a signal generator configured to generate the predetermined signal in the RX calibration process; and a switch circuit including:
- a first switch circuit coupled between the signal generator and the TX RF front-end circuit, the first switch circuit configured to be turned on in the RX calibration process and to be turned off in the TX calibration process; and
- a second switch circuit coupled between the TX RF front-end circuit and the RX RF front-end circuit, the second switch circuit configured to be turned on in both of the RX calibration process and the TX calibration process.

2. The wireless transceiver of claim 1, wherein:
each of the multiple RF transmitting circuits includes N transmission input-end(s) and N transmission output-end(s); the first switch circuit includes N first signal input-end(s) and N first signal output-end(s); the N first signal input-end(s) is/are coupled to the signal generator to receive the predetermined signal; and the N first signal output-end(s) is/are coupled to the N transmission input-end(s) of any of the multiple RF transmitting circuits to output the predetermined signal; and the N is equal to one or two; and each of the at least one RF receiving circuit includes N reception input-end(s) and N reception output-end(s); the second switch circuit includes N second signal input-end(s) and N second signal output-end(s); the N second signal input-end(s) is/are coupled to the N transmission output-end(s) of any of the multiple RF transmitting circuits to receive a derivative signal of the predetermined signal or a derivative signal of the RF transmission signal; and the N second signal output-end(s) is/are coupled to the N reception input-end(s) or the N reception output-end(s) of any of the at least one RF receiving circuit to output the derivative signal of the predetermined signal or the derivative signal of the RF transmission signal.

3. The wireless transceiver of claim 2, wherein each of the predetermined signal and the RF transmission signal is a differential signal, and the N is equal to two.

4. The wireless transceiver of claim 2, wherein the multiple RF transmitting circuits include a power amplifier driver (PA driver) and a power amplifier (PA), and the at least one RF receiving circuit includes a low noise amplifier (LNA).

5. The wireless transceiver of claim 1, wherein the first difference includes a first amplitude difference and a first phase difference; the second difference includes a second amplitude difference and a second phase difference; in the RX calibration process, the RX digital circuit performs the RX IQ calibration according to the first amplitude difference and the first phase difference; and in the TX calibration process, the RX digital circuit outputs the calibration reference to the TX digital circuit according to the second amplitude difference and the second phase difference to let the TX digital circuit perform the TX IQ calibration according to the calibration reference.

6. The wireless transceiver of claim 5, wherein the RX digital circuit performs the RX IQ calibration to compensate for the first amplitude difference and the first phase difference; and the TX digital circuit performs the TX IQ calibration to compensate for the second amplitude difference and the second phase difference.

7. The wireless transceiver of claim 6, wherein the RX digital circuit performs the RX IQ calibration to make the first amplitude difference be equal to zero or approximate zero, and make the first phase difference be equal to 90 degrees or approximate 90 degrees; and the TX digital circuit performs the TX IQ calibration to make the second amplitude difference be equal to zero or approximate zero, and make the second phase difference be equal to 90 degrees or approximate 90 degrees.

8. The wireless transceiver of claim 1, wherein the TX in-phase path mixing circuit is disabled and stops outputting the TX in-phase path up-conversion signal in the RX calibration process, and the TX quadrature-phase path mixing circuit is disabled and stops outputting the TX quadrature-phase path up-conversion signal in the RX calibration process.

9. The wireless transceiver of claim 1, wherein the wireless transceiver does not include the antenna.

* * * * *